US007227845B2

(12) United States Patent
Ray

(10) Patent No.: US 7,227,845 B2
(45) Date of Patent: Jun. 5, 2007

(54) METHOD AND APPARATUS FOR ENABLING A COMMUNICATION RESOURCE RESET

(75) Inventor: Dale Ray, Fort Worth, TX (US)

(73) Assignee: Motorola, Inc., Schaumburg, IL (US)

(*) Notice: Subject to any disclaimer, the term of this patent is extended or adjusted under 35 U.S.C. 154(b) by 1022 days.

(21) Appl. No.: 10/015,158

(22) Filed: Dec. 11, 2001

(65) Prior Publication Data
US 2003/0107989 A1 Jun. 12, 2003

(51) Int. Cl.
H04L 12/26 (2006.01)

(52) U.S. Cl. ........................ 370/242; 370/252
(58) Field of Classification Search ............... 370/241, 370/487, 314–319, 466, 395.1
See application file for complete search history.

(56) References Cited

U.S. PATENT DOCUMENTS

| 4,180,708 | A | * | 12/1979 | Yamaguchi et al. ......... 455/423 |
| 4,386,400 | A | * | 5/1983 | Cope et al. .................... 710/8 |
| 5,059,926 | A | | 10/1991 | Karczewski |
| 5,388,109 | A | * | 2/1995 | Hodge et al. ................ 714/807 |
| 5,956,650 | A | | 9/1999 | Suzuki et al. |
| 6,016,311 | A | * | 1/2000 | Gilbert et al. ............... 370/280 |
| 6,493,320 | B1 | * | 12/2002 | Schober et al. ............. 370/241 |
| 6,564,062 | B1 | * | 5/2003 | Hunzinger ................... 455/453 |
| 6,609,167 | B1 | * | 8/2003 | Bastiani et al. ............. 710/104 |
| H2079 | H | * | 9/2003 | Menon et al. ............... 370/329 |
| 6,665,311 | B2 | * | 12/2003 | Kondylis et al. ............ 370/462 |
| 6,731,649 | B1 | * | 5/2004 | Silverman ................... 370/466 |
| 2001/0038648 | A1 | | 11/2001 | Sulton et al. |
| 2003/0191862 | A1 | * | 10/2003 | Greenblat ................... 709/251 |
| 2004/0032836 | A1 | * | 2/2004 | Grilli et al. ................. 370/252 |

FOREIGN PATENT DOCUMENTS

WO  WO-01/11901 A1  2/2001

OTHER PUBLICATIONS

International Search Report Application No. PCT/US02/39014 dated May 9, 2003.
Plesiochronous—Wikipedia, the free encyclopedia. [Online] Available http://en.wikipedia.org/wiki/Plesiochronous, Feb. 8, 2006.

* cited by examiner

Primary Examiner—Hassan Kizou
Assistant Examiner—Salman Ahmed

(57) ABSTRACT

In accordance with the preferred embodiments of the present invention, a method (400) and an apparatus (e.g., base station (140)) for enabling a communication resource reset are described herein. In particular, a controller (e.g., a base station controller (120)) and a communication resource (e.g., a base station (140)) are in communication via a communication link (250). The method (400) provides a physical layer element (320) that is operatively coupled to the communication link (250). Further, the method (400) monitors a link parameter associated with the communication link (250) via the physical layer element (320). The method (400) restores the base station (140) to an initial state in response to a trigger event associated with the link parameter so that the base station controller (120) is operable to reestablish communication with the base station (140).

4 Claims, 2 Drawing Sheets

METHOD AND APPARATUS FOR ENABLING A COMMUNICATION RESOURCE RESET

FIELD OF THE INVENTION

The present invention relates to wireless communication systems, and more particularly, to a method and an apparatus, such as a base station, for enabling a communication resource reset.

BACKGROUND OF THE INVENTION

A wireless communication system is a complex network of systems and elements. Typically, the wireless communication system elements include (1) a radio link to the mobile stations (e.g., cellular telephones), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a call controller (e.g., a mobile switching center (MSC)) or switch, typically a call agent (i.e., a "softswitch"), for routing calls within the system, and (5) a link to the land line or public switch telephone network (PSTN), which is usually also provided by the call agent.

One aspect of designing a wireless communication system is to optimize the resources available to the wireless communication system. That is, one method of improving the availability of resources is to reduce the amount of time required to restore an errant resource back to operational status. Typically, a reset protocol is initiated by a controller when a communication resource such as a remote device does not respond to a command by the controller. For example, a base station controller may initiate a reset protocol if a base station is not responding to commands from the base station controller. However, the base station may not be able to receive, and therefore, initiate the reset protocol from the base station controller when the base station is not operable to respond to any commands from the base station controller. That is, the base station may not have been responding to the base station controller prior to the transmission of the reset protocol. As a result, the base station may not be functionally restored without a visit to the physical equipment itself for maintenance.

Therefore, a need exists for resetting a communication resource so that a controller may reestablish communication with the communication resource to optimize communication resources of the wireless communication system.

DETAILED DESCRIPTION OF THE PREFERRED EMBODIMENTS

Preferred embodiments of a method and an apparatus, such as a base station, for enabling a communication resource reset in a wireless communication system are described. The communication system provides communication service to a plurality of mobile stations. In particular, a controller (e.g., a base station controller) and a communication resource (e.g., a base station) are in communication via a communication link (e.g., an Ethernet link). The communication resource generally includes a physical layer element, which is operatively coupled to a reset element and the communication link. The reset element monitors a link parameter associated with the communication link via the physical layer element. The link parameter may be, but is not limited to, link speed associated with the communication link. Examples of link speed for an Ethernet link are one gigabits per second (Gb/s), 100 megabits per second (Mb/s), and 10 megabits per second (Mb/s). The reset element restores the communication resource to an initial state in response to a trigger event associated with the link parameter so that the controller is operable to reestablish communication with the communication resource. To illustrate this concept, the reset element may restore the communication resource to an initial state in response to a change in link speed associated with the communication link (e.g., a decrease in link speed from 100 Mb/s to 10 Mb/s). In another example, the reset element may restore the communication resource to an initial state in response to a decrease in link speed associated with the communication link for a time period (e.g., a decrease in link speed from 100 Mb/s to 10 Mb/s for more than three seconds). As a result of the occurrence of the trigger event, the communication resource is reset so that the controller may reestablish communication with the communication resource via the communication link.

Figure 1:
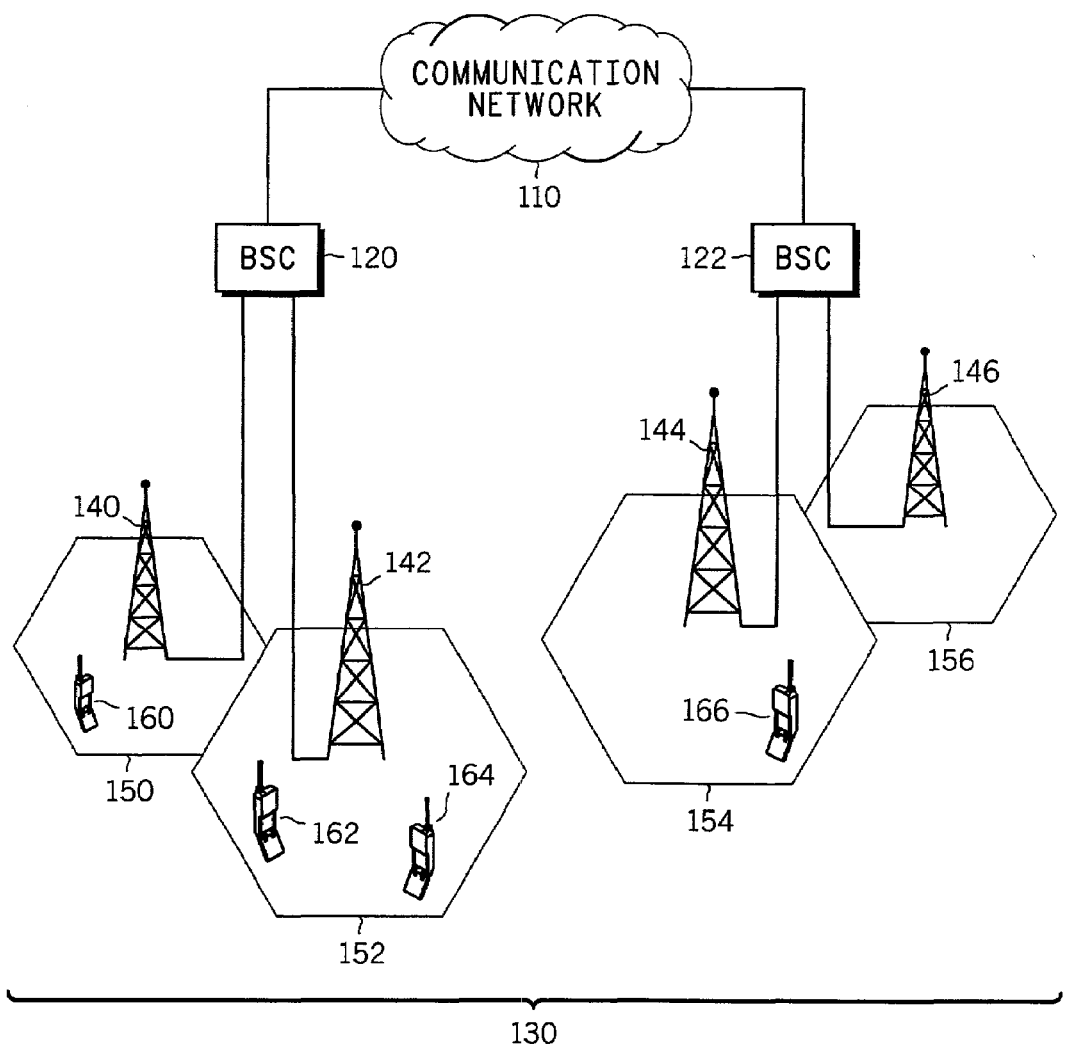
FIG. 1 is a block diagram representation of a wireless communication system that may be adapted to operate in accordance with the preferred embodiments of the present invention.

A communication system in accordance with the present invention is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS), 3G, the Universal Mobile Telecommunications System (UMTS) and variations and evolutions of these protocols. As shown in FIG. 1, a wireless communication system 100 includes a communication network 110, a plurality of base station controllers (BSC), generally shown as 120 and 122, servicing a total service area 130. The wireless communication system 100 may be, but is not limited to, a frequency division multiple access (FDMA) based communication system, a time division multiple access (TDMA) based communication system, and code division multiple access (CDMA) based communication system. As is known for such systems, each BSC 120 and 122 has associated therewith a plurality of base stations (BS), generally shown as 140, 142, 144, and 146, servicing communication cells, generally shown as 150, 152, 154, and 156, within the total service area 130. The BSCs 120 and 122, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
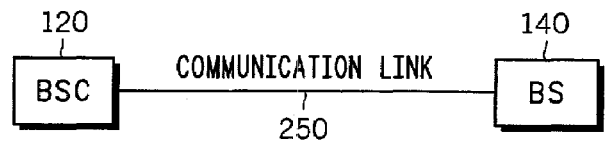
FIG. 2 is a block diagram representation of a base station subsystem that may be adapted to operate in accordance with the preferred embodiments of the present invention.

Typically, a controller and a communication resource (e.g., a remote device) in a wireless communication system are in communication via a communication link, e.g., an Ethernet link. Referring to FIG. 2, for example, a base station subsystem 200 generally includes a base station controller (BSC) 120 and a base station (BS) 140. The base station controller 120 and the base station 140 may be in communication via a communication link 250 such as an Ethernet link. Providing that the communication link 250 is active, the base station 140 monitors a link parameter associated with the communication link 250. A trigger event, which is associated with the link parameter, may cause the base station 140 to be restored to an initial state so that the base station controller 120 is operable to reestablish communication with the base station 140 via the communication link 250. For example, the communication link 250 may normally operate at 100 Mb/s or faster. In response to a change in link speed associated with the communication link 250, i.e., the trigger event, the base station 140 may be restored to an initial state so that the base station controller 120 is operable to reestablish communication with the base station 140 via the communication link 250. Thus, if the communication link 250 operates at a slower link speed such as 10 Mb/s then the base station 140 may be restored to an initial state so that the base station controller 120 is operable to reestablish communication with the base station 140 via the communication link 250. Alternatively, if the communication link 250 operates at a low link speed for more than a predetermined time period then the base station 140 may be restored to an initial state so that the base station controller 120 is operable to reestablish communication with base station 140 via the communication link 250. That is, the trigger event may incorporate both a performance measure of the communication link 250, e.g., speed, and a time measure. Thus, the base station 140 may not be restored to an initial state if the communication link 250 is operating at 10 Mb/s unless it does so for more than the time period. If the link speed returns to the nominal link speed, e.g., 100 Mb/s, from the low link speed, e.g., 10 Mb/s, within the time period, a reset is avoided. Otherwise, the base station 140 is restored to an initial state so that the base station controller 120 is operable to reestablish communication with the base station 140 via the communication link 250, i.e., the base station 140 is reset.

Figure 3:
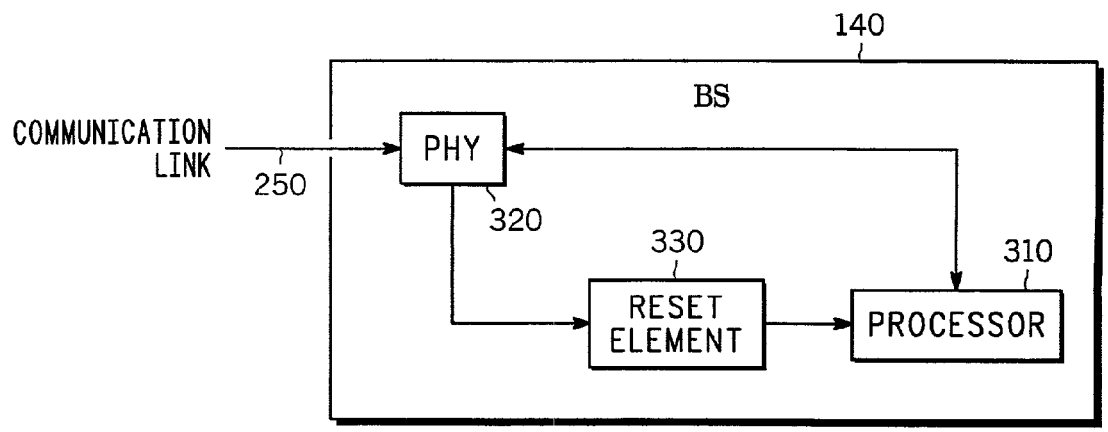
FIG. 3 is a block diagram representation of a base station that may be adapted to operate in accordance with the preferred embodiments of the present invention.

As shown in FIG. 3, a base station (e.g., base station 140 as shown in FIG. 2) is adapted in accordance with a preferred embodiment of the invention to enable a communication resource reset. The base station 140 generally includes a processor 310, a physical layer element 320 and a reset element 330. The physical layer element 320 and the reset element 330 may be integrated within a communication resource (e.g., base station 140). The physical layer element 320, such as an Ethernet physical layer device (PHY), is operatively coupled to the processor 310 and the communication link 250. Further, the physical layer element 320 is operatively coupled to the reset element 330, which in turn, is operatively coupled to the processor 310.

A basic flow for enabling a communication link reset for the base station 140 may start with the reset element 330 monitoring a link parameter associated with the communication link 250 via the physical layer element 320. The link parameter may be, but is not limited to, link speed associated with the communication link 250 such as 1 Gb/s, 100 Mb/s, and 10 Mb/s. Should the link speed fall below a predetermined speed, a trigger event restores the base station 140 to an initial state so that a controller (e.g., base station controller 120 as shown in FIG. 2) is operable to reestablish communication with the base station 140 via the communication link 250. An alternate trigger event may be a decrease in link speed associated with the communication link 250 for a time period. To illustrate these two trigger event concepts, the reset element 330 may restore the base station 140 to an initial state in response to the link speed decreasing from 100 Mb/s to 10 Mb/s. Alternatively, the reset element 330 may restore the base station 140 to an initial state in response to the link speed decreasing from 100 Mb/s to 10 Mb/s such that the communication link operates at 10 Mb/s for more than three seconds. In response to restoration of the base station 140 to an initial state, the processor 310 is reset causing communication with the base station 140 to be automatically reestablished via the communication link 250 by the controller.

Figure 4:
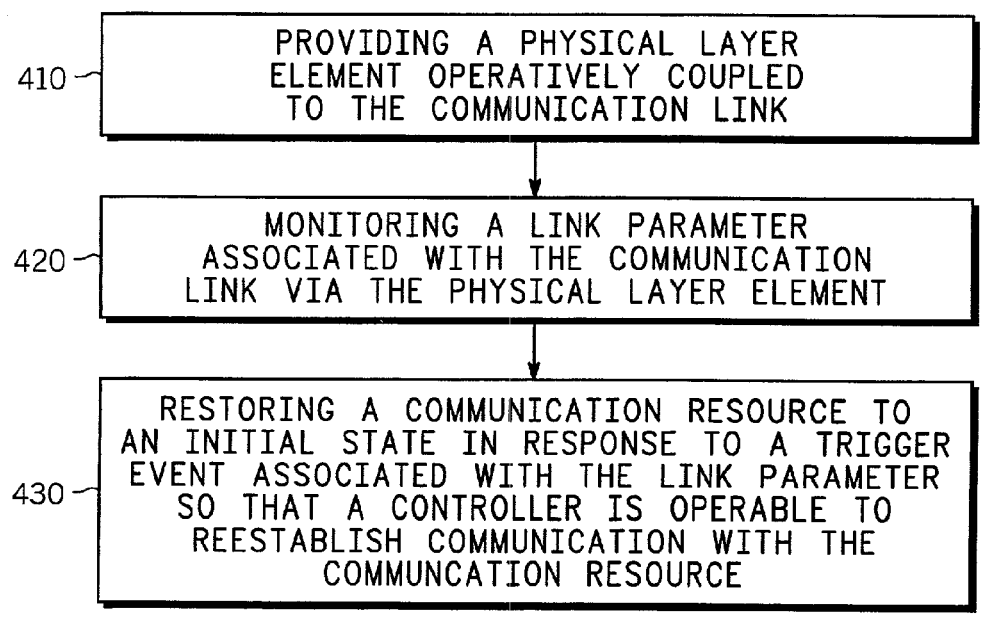
FIG. 4 is a flow diagram illustrating a method for enabling a communication link reset in accordance with the preferred embodiments of the present invention.

In accordance with the preferred embodiments of the present invention, and with references to FIG. 4, a method 400 for enabling a communication resource reset is shown. Method 400 begins at step 410, where a physical layer element is provided within a communication resource (e.g., a remote device such as a base station) such that a logic circuit and the physical layer element are in communication. In particular, the physical layer element is operatively coupled to a communication link so that the logic circuit may be operable to monitor a link parameter associated with the communication link. The logic circuit may be, but is not limited to, an application specific integrated circuit operating in the communication resource. The communication resource is in communication with a controller, such as a base station controller, via the communication link. At step 420, the logic circuit monitors the link parameter associated with the communication link via the physical layer element. The second link parameter may be, but is not limited to, link speed associated with the communication link. Thus, for example, with the communication link active, the logic circuit monitors link speed associated with the communication link. At step 430, the logic circuit restores the communication resource to an initial state in response to a trigger event associated with the link parameter so that the controller is operable to reestablish communication with the communication resource via the communication link. For example, the logic circuit may restore the communication resource to an initial state in response to a change in link speed associated with the communication link. In another example, the logic circuit may restore the communication resource to an initial state in response to a decrease in link speed associated with the communication link for a time period. That is, the logic circuit restores the communication resource to an initial state if the communication link operates at a low link speed for more than the time period. As a result of restoring the communication resource to an initial state, the communication resource is reset so that the controller may reestablish communication with the communication resource via the communication link.

Many changes and modifications could be made to the invention without departing from the fair scope and spirit thereof. The scope of some changes is discussed above. The scope of others will become apparent from the appended claims.

What is claimed:

1. In a communication system, wherein a controller and a communication resource are in communication via a communication link, a method for enabling a communication resource reset, the method comprising:

provide a physical layer element within the communication resource, the physical layer element being operatively coupled to the communication link;

monitoring a link parameter via the physical layer element, the link parameter being associated with the communication link, and wherein the communication link is an Ethernet link; and restoring the communication resource to an initial state in response to a trigger event so that the controller is operable to reestablish communication with the communication resource, the trigger event being associated with the link parameter, wherein the step of restoring the communication resource to an initial state in response to a trigger event such that the controller is operable to reestablish communication with the communication resource comprises restoring the communication resource to an initial state in response to a decrease in link speed associated with the communication link from 100 megabits per second (Mb/s) to 10 megabits per second (Mb/s).

2. In a wireless communication system, the communication system providing communication service to a plurality of mobile stations, wherein a base station controller and a base station are in communication via a communication link, and wherein the base station is operable to enable a reset, the base station comprising:

a processor;

a physical layer element operatively coupled to the processor and the communication link;

a reset element operatively coupled to the processor and the physical layer element, the reset element being operable to monitor a link parameter associated with the communication link via the physical layer element, and wherein the communication link is an Ethernet link; and the reset element being operable to restore the base station to an initial state in response to a trigger event so that the base station controller is operable to reestablish communication with the base station, wherein the trigger event is associated with the link parameter, and wherein the trigger event comprises a decrease in link speed associated with the communication link from 100 megabits per second (Mb/s) to 10 megabits per second (Mb/s).

3. In a communication system, wherein a controller and a communication resource are in communication via a communication link, and wherein a processor operates in accordance to a logic circuit for enabling a communication resource reset, the logic circuit comprising:

a first logic that directs the logic circuit to communicate with a physical layer element within the communication resource, the physical layer element being operatively coupled to the communication link;

a second logic that directs the logic circuit to monitor a link parameter via a physical layer element, the link parameter associated with the communication link, and wherein the communication link is an Ethernet link; and a third logic that directs the logic circuit to restore the communication resource to an initial state in response to a trigger event so that the controller is operable to reestablish communication with the communication resource, wherein the trigger event is associated with the link parameter, and wherein the third logic comprises a logic that directs the logic circuit to restore the communication resource to an initial state in response to a decrease in link speed associated with the communication link from 100 megabits per second (Mb/s) to 10 megabits per second (Mb/s).

4. In a communication system, wherein a controlling device and a controlled device are in communication via a communication link, an apparatus for resetting the controlled device, the apparatus comprising:

a physical layer element within the controlled device, the physically layer being operatively coupled to the communication link;

a reset element operatively coupled to the physical layer element, the reset element being operable to monitor a link parameter associated with the communication link via the physical layer element, and wherein the communication link is an Ethernet link; and the reset element being operable to restore the controlled device to an initial state in response to a trigger event so that the controlling device is operable to reestablish communication with the controlled device, wherein the trigger event is associated with the link parameter, and wherein the trigger event comprises a decrease in link speed associated with the communication link from 100 megabits per second (Mb/s) to 10 megabits per second (Mb/s).

* * * * *